Figure 1:
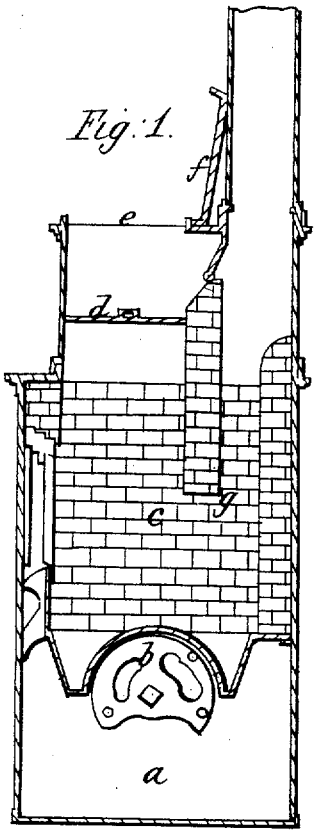

BEST AVAILABLE COPY 7,643 X

E. Nott,

Magazine Stove.

Patented June 29, 1833.

N. PETERS, PHOTO-LITHOGRAPHER, WASHINGTON, D. C.

7643X

June 29. 1833

Eliphalet Nott.

Case "9"

Letters Patent.

The Schedule referred to in these Letters Patent and making part of the same, containing a description in the words of the said Eliphalet Nott, himself of his improvement in the material, form and construction of Stovepipe, to be employed where Anthracite coal is the fuel in use.

---

Case "No. 9."

Specification of improvements made in the material, form and construction of Stove pipe to be employed, where Anthracite coal is the fuel in use. Whereas great inconvenience, has arisen in the use of Anthracite coal, from the escape of gas, when the heat has been imparted, from, and the smoke passed off in a Sheet iron flue reverberated in the usual manner by elbows, as well as from the destruction of the flue itself, on account of the great weight of the smoke arising from said coal, and a corresponding concentration of the acid contained therein. Therefore an improvement has been introduced, and the same having been tested and perfected by repeated experiments, is deemed worthy of being carried into general use: which improvement consists; In making use of rough, cast iron, hollow, parallelopipeds, for so much of the flue as it is desirable to employ for giving off to the room the requisite heat, the same to be adjusted vertically; in place of smooth sheet iron, hollow, cylinders either with or without reverberation. Which may be effected by combining either by screws, or bolts, or any other expedient, two opposite rough and wide plates, with two opposite, rough and narrow ones, in such manner that the same, shall contain little internal space and present much external surface; that is shall resemble each a hollow parallelopiped — And by elongating such flue to the height desired by placing one section thereof upon another, and adjusting the two together together in such manner that the upper one shall either set over or
into the under one; the former being preferable — or by placing
an open cover over, and confining the same to the lower section; said
cover carrying a rabbet, around its contained opening for the purpose
of receiving and steadying the upper section when set thereon; and that
whether the crust of the calibre thereof, shall be fitted to the outer side or
the inner side of said rabbet; the two in either case to be screwed or
bolted together; — It is to be understood that said parallelopipeds
may present any external form though some regular architectural
form is preferred — The calibre of said flue, for a common stove,
should be about two inches deep; and the wider the better, pro=
vided the same do not exceed in width the stove itself; and the
construction will be more perfect, if a groove be sunk on the inner
face, and at the outer edge of the wider plates, for receiving the
edges of the two narrower ones, when adjusted in place. For further
information, reference may be had to the drawings hereunto ap
pended, by which it may be seen, how the ends of flue are held by a gum
in the front and back; and how two sections may be combined by inter
=mediate entablature. <u>Summary.</u> The improvement herein
contemplated, consists in securing a draft; in increasing the conduct
=ing and radiating power of the flue, so that it will give off to the room
the requisite heat, without being reverberated; and in preventing
the destruction of the flue itself, by making use of rough, cast-iron pipe,
in the form of hollow parallelopipeds, in place of smooth, sheet iron pipe
in the form of cylinders, for so much of the flue, as it may be desirable
to employ for giving off the requisite heat to the room.
I therefore claim as my invention & improvement, the securing of
the draft; — the increasing of the conducting and radiating power
of the flue, and the preventing of the speedy destruction of the flue itself
by making use of rough, cast iron pipe, combined as aforesaid, in
the form of hollow parallelopipeds, in place of smooth, sheet iron pipe
in the form of hollow cylinders, for so much thereof, as it may be desirable to
employ for giving off the requisite heat to the room; together with
the

7643X

199.

the uses to which the same has been or may hereafter employed in stoves and furnaces.—

O. M. Boyd
D. Boyd } Winnipeg

Elisha Scott

Fwd.
[illegible]

648.

(Granted June 29. 1892)
(Dr on Port folio)